United States Patent [19]

Lea

[11] Patent Number: 4,583,824
[45] Date of Patent: Apr. 22, 1986

[54] ELECTROCAPILLARY DEVICES

[75] Inventor: Michael C. Lea, Rochester, N.Y.

[73] Assignee: University of Rochester, Rochester, N.Y.

[21] Appl. No.: 659,386

[22] Filed: Oct. 10, 1984

[51] Int. Cl.⁴ .............................................. G02B 26/02
[52] U.S. Cl. ..................................... 350/267; 350/360
[58] Field of Search ................. 350/267, 359, 360–363

[56] References Cited

U.S. PATENT DOCUMENTS

| 3,008,374 | 11/1961 | Kreisman | 350/267 |
| 3,889,080 | 6/1975 | Lucian | 200/192 |
| 4,395,775 | 7/1983 | Roberts et al. | 350/319 |

OTHER PUBLICATIONS

Lea, M. C., "Optical Modulators Based on Electrocapillarity", *Optics Letters*, vol. 6, No. 8, pp. 395–397, Aug. 1981.
Beni G. et al., "Electrowetting Displays"; *Applied Phys. Lett.* (4), Feb. 15, 1981, pp. 207–209.
Jackel, J. L. et al., "Electrowetting Switch for Multimode Optical Fibers", *Applied Optics* vol. 22, No. 11, pp. 1765–1770, Jun. 1, 1983.
Jackel, J. L. et al., "Electrowetting Optical Switch" *Appl. Phys. Lett.* 40(1), Jan. 1, 1982, pp. 4–6.
Beni, G. et al., "Continuous Electrowetting Effect" *Appl. Phys. Lett.* 40(10) May 15, 1982, pp. 912–914.
Beni, G. et al., "Dynamics of Electrowetting Displays", *J. Appl. Phys.* 52(10), Oct. 1981, pp. 6011–6015.

Primary Examiner—Bruce Y. Arnold
Attorney, Agent, or Firm—Martin LuKacher

[57] ABSTRACT

Bistable electrocapillary devices useful as optical devices, which can be arranged in arrays to provide optical displays, use mercury/electrolyte interfaces which may be located in reservoirs in the form of narrow parallel gaps between an insulating sheet and glass plates. The gaps are connected by a capillary which extends through the sheet. A variable radius circular mirror is formed by the surface of the mercury where it contacts the glass sheets. A potential is applied briefly (as a pulse) across the interface to switch the mercury between two stable states. The diameter of the mirror is thereby also switched between two stable values. Light reflected from the mirror is modulated by variations in the mirror diameter. A panel display utilizes an arrangement of devices forming an array of mirrors which modulate light reflected therefrom to form an image in accordance with switching signals applied to the devices of the array.

25 Claims, 14 Drawing Figures

ELECTROCAPILLARY DEVICES

The U.S. government has rights in this invention under contract DAAG 29-81-K-0134.

DESCRIPTION

The present invention relates to electrocapillary devices and particularly to bistable optical devices based upon electrocapillarity and displays utilizing the same.

The invention is especially suitable for use as a light modulator device which modulates light reflected therefrom, which, when arranged in an array, provides a projection display.

Optical modulators based on electrocapillarity are described in an article by the inventor hereof which appeared in *Optics Letters*, Vol. 6, No. 8, pages 395–396 (August 1981). The electrocapillary effect has also been used in transducers (See U.S. Pat. No. 3,889,086 issued June 10, 1975). Such devices are, however, mechanically unstable or require continuous application of driving signals. Other optical modulator and switching devices, based upon the electrowetting effect, have been proposed. Such devices also depend upon friction, specially formed micro-structures, or the maintenance of driving signals for mechanical stability (See G. Beni and S. Hackwood, *Appl. Phys. Lett.*, 38(4), 207, Feb. 15, 1981; G. Beni and M. A. Tenan, *J. Appl. Phys.* 52(10), 6011, October 1981; G. Beni, S. Hackwood and J. L. Jackel, *Appl. Phys. Lett.*, 40(10), 912, May 15, 1982; J. L. Jackel, S. Hackwood and G. Beni, *Appl. Phys. Lett.*, 40(1), Jan. 1, 1982 and J. L. Jackel, S. Hackwood, J. J. Veselka and G. Beni, Applied Optics, 22(11), 1765, June 1, 1983).

It is the principal object of the present invention to provide an improved device based on capillarity effects which is bistable and does not require the maintenance of driving signals.

It is another object of the present invention to provide an improved electrocapillary device which has a fluid switchable through a capillary between stable positions by the application of driving signals and which is constrained by forces developed as a result of interfacial tension and the geometry of the device to be mechanically bistable.

It is a further object of the present invention to provide improved optical devices such as optical modulators and displays, especially displays operating in projection, which are based on electrocapillarity.

It is a still further object of the present invention to provide improved electrocapillary optical devices having variable area mirrors, the area of which is switchable between two stable values in one of which more and the other of which less (or no) light can be reflected to modulate the reflected light and form, with an array of such mirrors, an optical display.

Briefly described, a bistable capillary device embodying the invention, which can be arranged in an array for use as a display, makes use of a housing defining a pair of fluid reservoirs. A capillary communicates the reservoirs with each other. First and second immiscible fluids present first and second interfaces to the reservoirs. The first fluid is disposed in at least one of the reservoirs and is flowable between the reservoirs through the capillary between first and second stable positions in response to pressure differences across the interfaces; the interfacial pressures being balanced in the first and second positions. Means are also provided for changing the interfacial tension between the fluids to switch the positions of the first fluid between its first and second positions.

The foregoing and other objects, features and advantages of the invention as well as presently preferred embodiments thereof will become more apparent from a reading of the following description in connection with the accompanying drawings in which:

Figure 1:
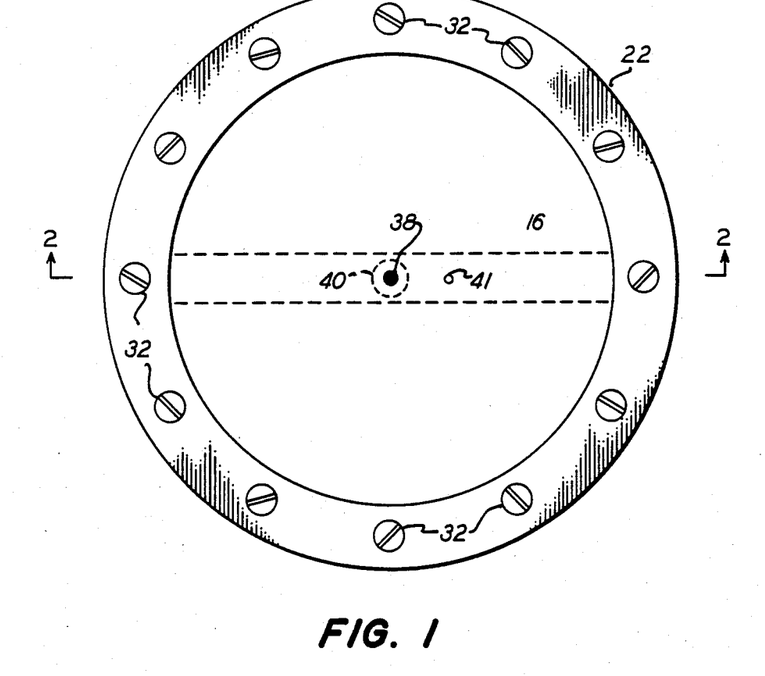
FIG. 1 is a top view of an optical electrocapillary device embodying the invention.
Figure 2:
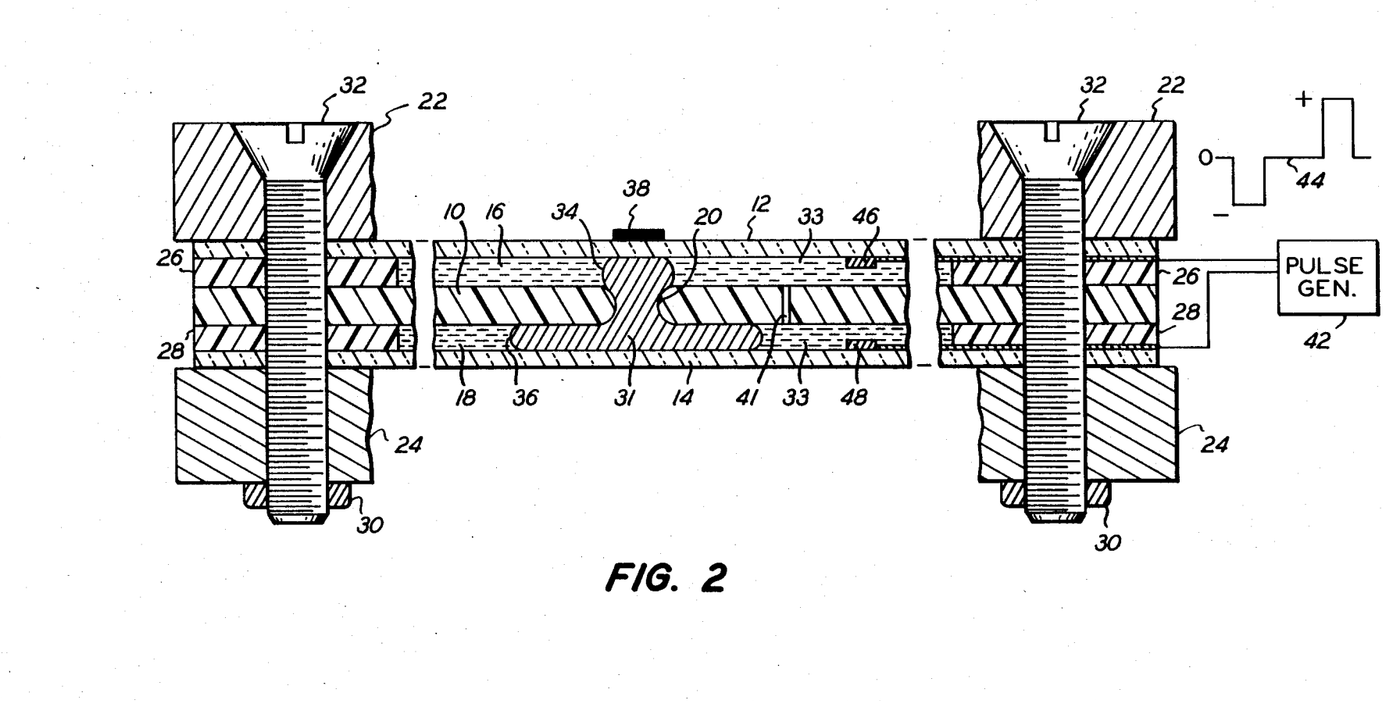
FIG. 2 is an enlarged sectional view of the device shown in FIG. 1, taken along the line 2—2 in FIG. 1.

Referring first to FIGS. 1 and 2, there is shown a bistable optical device based upon electrocapillary which provides a mirror of smaller or larger area of its reflecting surface in two stable states. The device is planar, and disc shaped as illustrated, but may be rectangular and other shapes. A planar member 10 of insulating material, suitably a vinyl plastic sheet is sandwiched between two glass plates 12 and 14. Gaps 16 and 18 between the opposite surfaces of the sheet 10 and the plates 12 and 14 provide reservoirs for two immisible fluids. One of these fluids is a body 31 of fluid having a high coefficient of reflectivity. Preferrably, this fluid is mercury. The body 31 of mercury is disposed in a capillary 20, which is a hole through the sheet 10 which communicates the reservoirs 16 and 18. The reservoirs may be in the form of channels which are provided by spacers, generally semi-circular in shape, between the glass plates 12 and 14 and the sheet 10. The glass plates 12 and 14 and the sheet 10 are assembled with the spacers to provide the channel shaped reservoirs by a clamping arrangement. This arrangement is made up of clamping rings 22 and 24, spacer rings 26 and 28 of insulating material, which may be part of the spacers which define the channel shape reservoirs 16 and 18, and nuts 30 and bolts 32.

The body 31 of mercury is surrounded by a conductive liquid or an electrolyte. A suitable electrolyte is aqueous 0.1 M $Na_2SO_4 + 10^{-5}$ M hexadecytrimethylammomium bromide.

There are electrolyte/mercury interfaces 34 and 36 in the reservoirs 16 and 18 where the electrolyte 33 contacts the mercury. The mercury also contacts the inside surfaces of the glass plates 12 and 14 to form variable radius circular mirrors. One or both of these mirrors may be used. However, in the illustrated device only the mirror defined between the glass plate 12 and the surface of the mercury body 31 is used. A block 38 of absorbing material of diameter approximately equal to the smaller diameter mirror is used to cut off reflection from the smaller diameter mirror. The larger diameter mirror is illustrated by the circle 40 in FIG. 1.

Switching potentials are applied from a pulse generator 42. These potentials may be negative pulses or positive pulses to switch the device, and particularly the body of mercury 31, between its stable positions, in one of which the radius of the mirror which is blocked by the absorbing block 38 is small, and in the other which 40, it is larger. These potentials are applied to electrodes 46 and 48 which contact the electrolyte 33 in the reservoir 16 and 18. Leads connect these electrodes to the pulse generator 42. When a pulse voltage is not present the potential of the electrodes may be zero or open circuit.

Figure 3A:
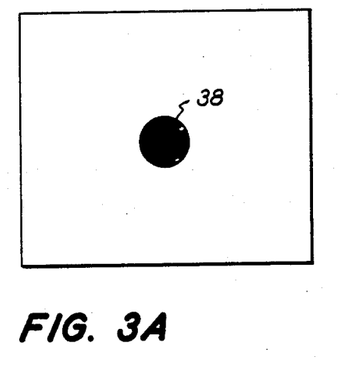
FIGS. 3A–3D are simplified, fragmentary views of the device shown in FIGS. 1 and 2, which illustrate the operation thereof.

The operation of the device will be more apparent from FIGS. 3 and 3A. As shown in FIG. 3, the capillary 20 has a radius $r_o$. The width of the gaps which define the reservoir 16 and 18 is indicated as (d). The radius of the reflecting mirror surface of the mercury body 31 is indicated as R. The mechanical equilibrium of the arrangement is determined by the pressure difference across the interfaces 34 and 36. For a geometry as shown in FIG. 3, there are two positions at which the pressures are balanced for each of the interfaces. While position S1 (FIG. 3A) is in stable equilibrium, position S2 is unstable. If the body of mercury 31 is set in position S2, it will continue to move into the gap, and the large radius R which provides a large area mirror surface will not be maintained. By virtue of the use of two gaps 16 and 18 back to back, the pressures become balanced. Moreover, if the body 31 of mercury moves slightly in either direction, the more rapid change in pressure difference across the interface 36 of smaller radius opposes the motion and enhances mechancial stability. It is desirable that both of the reservoirs be at constant pressure. A small aperture 41 in the insulating sheet 10 may be used for this purpose. The resistance of this aperture is very high and does not have a material effect on the switching potentials which are applied to the device by the pulse generator 42.

Figure 3B:
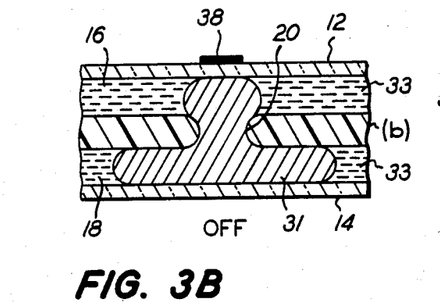
Figure 3C:
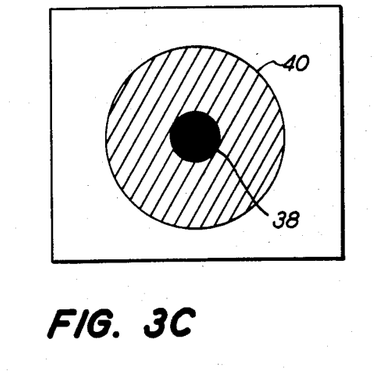
Figure 3D:
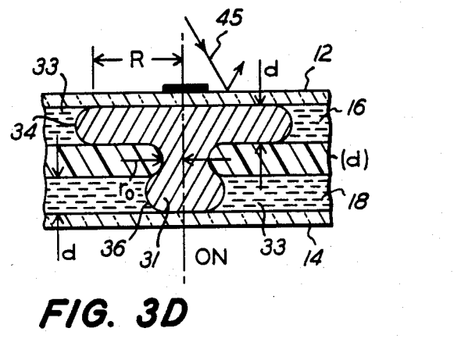
Figure 3E:
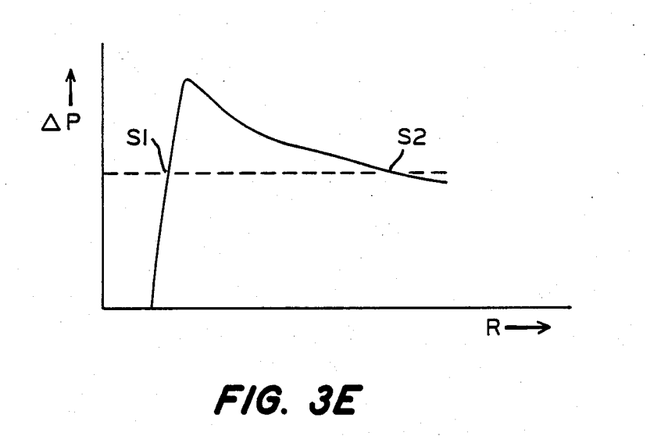
FIG. 3E is a curve illustrating the pressure difference across the fluid interfaces in the device illustrated in FIGS. 1, 2 and 3A–3D.

The switching between the two stable states shown as the "off" state in FIG. 3B and the "on" state in FIG. 3D is obtained by applying potential across the interfaces thereby changing the differential pressure and causing the body 31 of mercury to move through the capillary 20. Very low voltages are needed ($\pm 1$ volt) so that once the device has been switched, the voltage can be removed. This requirement for pulses rather than constant voltages which might initiate unwanted reactions in the electrolyte or mercury is highly advantageous, since bubbling or electrochemical deterioration is avoided. The device is optically efficient and mechanically robust. In a device where the dimension $r_o$ is 165 micrometers ($\mu$m), and the gap widths d are each 20 $\mu$m, the switching time is about 3 milliseconds (ms). The radius of the mirror provided by the surface of the mercury body 31 which contacts the plate 12 changes from 175 to 250 $\mu$m. Then light, illustrated by the ray 45 in FIG. 3D, can be reflected or not reflected depending upon the state to which the device is switched. Light intensities may be modulated through the use of device. A grey scale can be produced by continuously switching the device on and off at different rates, since the ratio of the on and off time controls the apparent intensity as seem by an observer. Alternatively, grey scale can be obtained by making the width of the gaps unequal. The device will then not be bistable. The voltage will have to be maintained but the radius of the mirror will depend upon the amplitude of the applied voltage, and by changing the amplitude the illumination on which is reflected can be changed.

The herein described device is discussed in recent publications authored by the inventor hereof which have been publication within a year of the filing date hereof; namely an article entitled "An Optical Modulator based on Electrocapillary", appearing in *Applied Physics Letters*, Vol. 43 No. 8, p. 738-740, Oct. 15, 1983; and an article entitled "Optical Modulators Based on Electrocapillary", appearing in SPIE Vol. 465-spatial Light Modulators and Applications, published by the Society of Photo Optical Instrumentation Engineers, Bellingham, Wash. U.S.A. (1984). Further information concerning the theory of operation of the devices emboding the invention will be further apparent from these articles. Applicant, of course, does not restrict his invention to any theory of any operation.

Figure 4A:
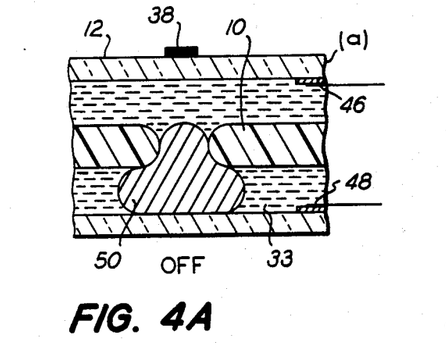
FIGS. 4A and 4B are diagrammatic, fragmentary sectional views illustrating the operation of a bistable electrocapillary optical device in accordance with another embodiment of the invention.
Figure 4B:
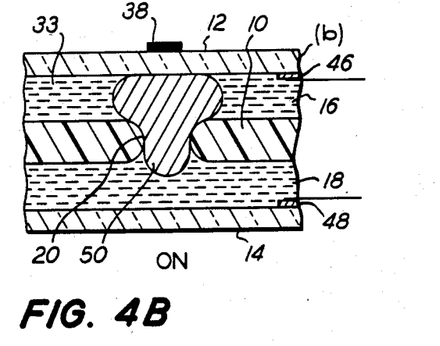

Another embodiment of the invention is illustrated in FIGS. 4A and 4B, where parts thereof which are like those embodiment of FIGS. 1 through 3 are indicated by like reference numerals. The mercury body 50 which is used in the embodiment shown in FIGS. 4A and 4B contains less mercury than the body 31 of FIGS. 1 througn 3. This affords a somewhat different geommetry, such that the mercury switches between contact and noncontact states with the inside surfaces of the glass plates 12 and 14.

Figure 9:
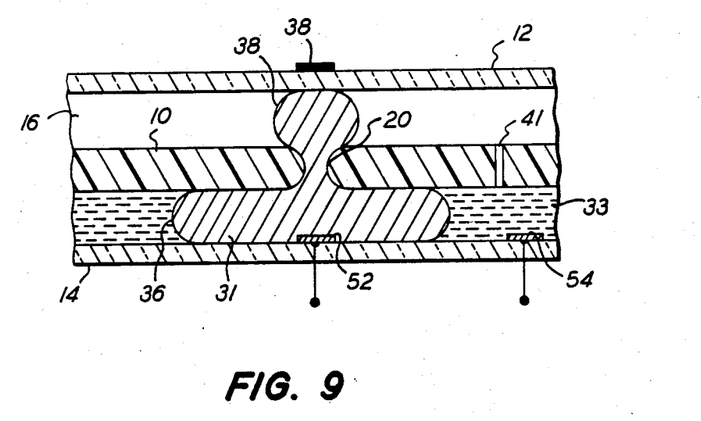
FIG. 9 is a view of a bistable, electrocapillary optical device in accordance with still another embodiment invention.

Another embodiment of the invention is shown in FIG. 9, where like parts also shown by like reference numerals. The fluid in the reservoir 16 is not an electrolyte liquid, but rather is a gas, such as air. The interfacial tension and the pressure difference across only the interface 36 is varied to switch the position of the body 31 of mercury. Accordingly, electrodes 52 and 54 are disposed in contact with the electrolyte 33 and approximately concentrically with the capillary 20 on the inside surface of the glass plate 14.

The electrolyte and the mercury may be supplied during the assembly of the device by assembling the device in a body of electrolyte and placing a drop of mercury in the capillary prior to placement of the upper glass plate and clamping of the assembly together. Alternatively, the mercury and electrolyte may be supplied by tubes which enter into regions of the reservoirs concentric with the capillary and spaced from the capillary. These tubes may be of glass and sealed off after the mercury and electrolyte are inserted.

Figure 5:
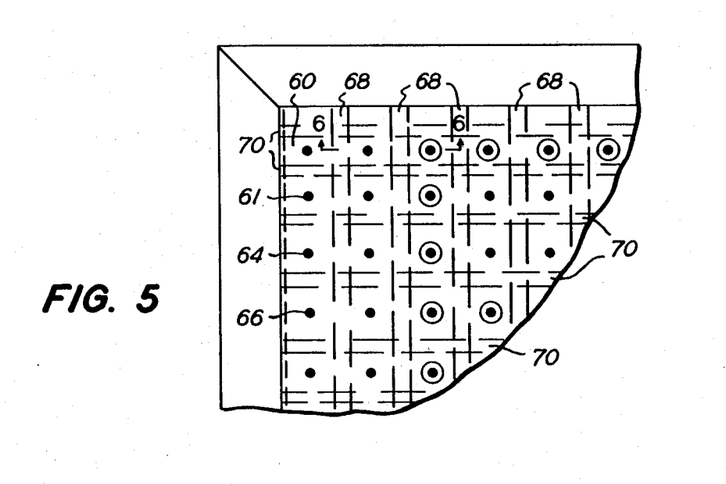
FIG. 5 is a fragmentary, top view of a display in the form of a panel containing an array of devices similar to those illustrated in FIGS. 1 and 2.
Figure 6:
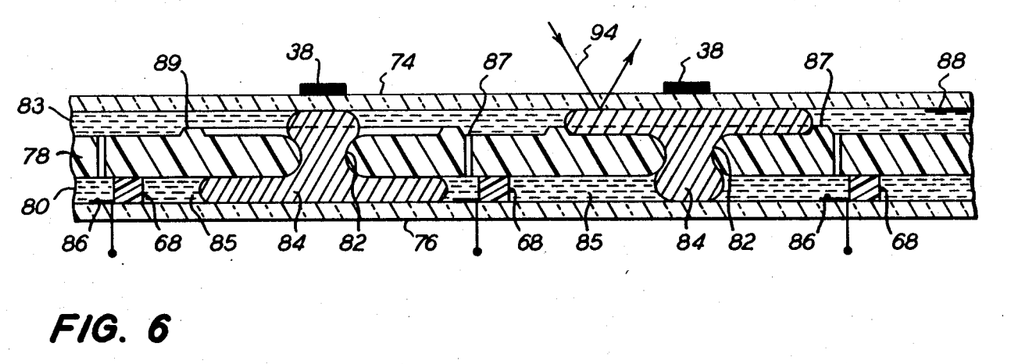
FIG. 6 is a fragmentary, sectional view of the device shown in FIG. 5, taken along the line 6—6 in FIG. 5.

Referring to FIGS. 5 and 6, there is shown a panel array of mechanically bistable, electrocapillary optical devices in rows 61, 64, 66 . . . Each device is in a separate cell or area in the panel. The areas are defined by rows and columns of insulating spacers 68 and 70. The device uses common upper and lower glass plates 74 and 76. A common planar member or sheet 78 of insulating material has holes, which define the capillaries 82 of each of the devices. Columns and rows of insulating spacers 68 and 70 define the individual cells in the lower gap 80 between the sheet 78 and the lower glass plate 76. Each capillary 82 has a body 84 of reflecting liquid (Hg) similar to the bodies 31. The reservoirs 84 in each of the cells in the gap 80 are filled with an electrolyte. The gap 83, between the insulating sheet 78 and the upper glass plate of 74, is also filled with electrolyte. Individual electrodes 86 on the inside surface of the lower plate 76 make contact with the electrolyte in the reservoirs 85. A common electrode 88 makes contact with the electrolyte in the upper reservoir 83.

Figure 8:
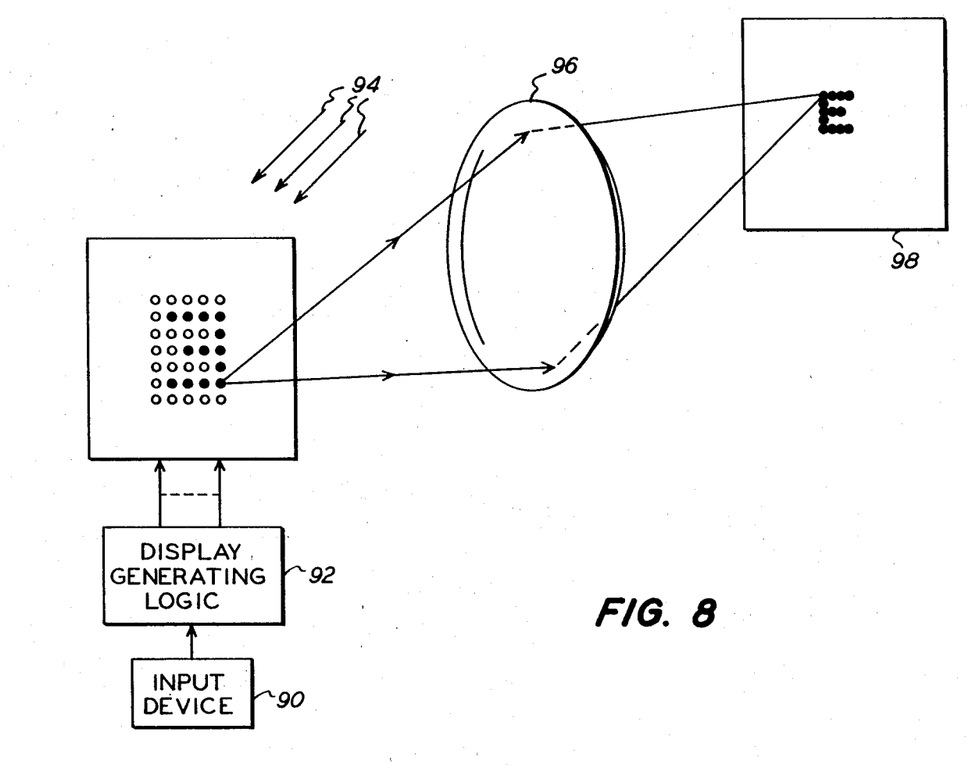
FIG. 8 is a diagrammatic view also illustrating how an array, such as shown in FIGS. 5 and 6, may be used to display images.

As shown in FIG. 8 an input device 90 such, as a keyboard or computer, operates display generating logic 92 to selectively apply pulses of different potential to switch the devices in each cell between the off state, as shown in the left hand cell in FIG. 6, to the on state, as shown by the cell in the right hand side of FIG. 6. Of course, in the on state the light 94, which is made incident on each device is reflected through a projection lens 96 onto a screen 98 to project an image.

Figure 7:
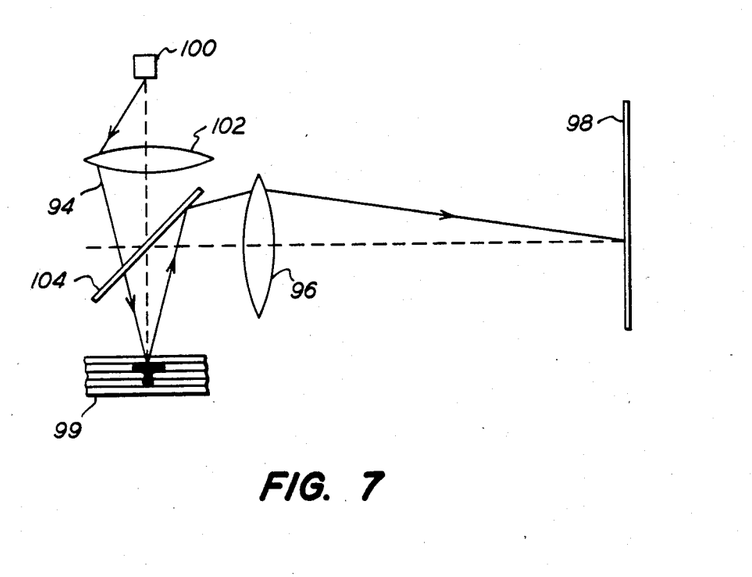
FIG. 7 is a diagrammatic view illustrating the use of device in a projection display.

FIG. 7 illustrates an individual device 99 in the array and how incident like from a source 100 such as a projection lamp is focused or collimated by a lens 102 to be incident on the array. The ray paths to an individual device 99 are illustrated in FIG. 7 and FIG. 8. It will be appreciated, of course, that the entire array is illuminated simmultaneously and the display is imaged at once. In FIG. 7, a beamspliter 104 is used to direct the light reflected from the devices of the array to the screen 98.

The individual devices operate as was explained in connection with FIGS. 1 through 3E. Individual pressure equalizing apertures 87 communicate each cell in the lower reservoirs with the upper reservoir. The confinment of the mercury in the upper reservoir may be assisted through the use of annular ridges 89 of the insulating material of the central sheet 78 which surrounds the capillary 82 in each cell. In FIGS. 5 and 8, the letter E is indicated as being the image displayed, by way of example.

Wnile various embodiments of the invention, both as individual devices and arrays have been illustrated herein, it will be appreciated that variations and modifications thereof, with the scope of the invention, will become apparent to those skilled in the art. Accordingly, the foregoing description should be taken as illustrative and not in a limiting since.

I claim:

1. A bistable device which comprises a housing defining a pair of fluid reservoirs, a capillary communicating said reservoirs with each other, first and second immisible fluids in said housing defining first and second interfaces, said first fluid being disposed in at least one of the reservoirs and being flowable between the reservoirs through said capillary between first and second stable positions in response to the pressure differences across the interfaces, said interfacial pressures being balanced in said first and second positions, and means for changing the interfacial tension between said fluids to switch the position of the first fluid between said first stable position and said second stable position.

2. The bistable device according to claim 1 wherein said first fluid presents a light intercepting surface so as to provide an optical device.

3. The bistable optical device according to claim 2 wherein said light intercepting surface has different areas in said first and second positions for modulating light.

4. The device according to claim 3 wherein said first fluid is a reflecting liquid, and said surface is a reflecting surface of different area in said first and second positions.

5. The invention is set forth in claim 3 wherein a plurality of said devices are disposed in array, and means connected to the interfacial tension changing means of said devices to form images from the light modulated by the devices.

6. The device according to claim 1 wherein said first and second fluids are mercury and a liquid electrolyte, respectively.

7. The device according to claim 6 wherein said mercury is encompassed by said electrolyte and is disposed in one of said reservoirs, and the other said reservoirs contains a fluid in gaseous state, such as air.

8. The optical device according to claim 1 wherein said fluid reservoirs are defined by the gap between a first plate of insulating material on one side of insulating planar member and the gap between a second plate of insulating material and the opposite side of said insulating planar member, said capillary extending through said member between said one side and said opposite side of said member.

9. The device according to claim 8 wherein said gaps are symmetrically disposed about said member.

10. The device according to claim 9 wherein said first fluid is a liquid which is substantially totally light reflecting at said surface.

11. The device according to claim 10 wherein said first fluid is mercury.

12. The device according to claim 8 wherein said capillary has a radius larger than the width of either of said gaps.

13. The device according to claim 8 wherein said first fluid is mercury and second fluid is a liquid electrolyte.

14. The device according to claim 1 wherein said first fluid and second fluid are conductive liquids, and said means for changing the interfacial tension comprises means for applying an electrical potential across at least one of said first and second interfaces.

15. The device according to claim 14 wherein said potential applying means comprises electrodes in contact with said second fluid in one of said reservoirs and in contact with said second fluid in the other of said reservoirs.

16. The device according to claim 14 wherein said potential applying means comprises an electrode in contact with said first fluid and another electrode in contact with said second fluid, both said electrodes extending into the same one of said reservoirs.

17. The device according to claim 1 further comprising an opening of cross section smaller than the cross section of said capillary for equalizing the pressures in the region of said first and second reservoir surrounding and spaced from first fluid.

18. An optical device comprises first and second plates of insulating material, at least said first plate being transparent, a planar member of insulating material, said planar member being disposed between said plates to define first and second gaps between opposite sides of member and said first and second plates, respectively, an array of capillaries in said member communicating said gaps, means in at least said second gap for defining individual chambers around each of said capillaries reflecting liquid bodies in said capillaries and flowable through said capillaries between a first position in said second gap and a second position to present a reflecting surface at the interface of said reflecting liquid and said transparent plate, an electrolyte immissible with said reflecting liquid filling at least said second gap chambers around said reflecting liquid and defining interfaces therebetween, and means for changing the interfacial pressure between said reflecting liquid and said electrolyte to switch said reflecting liquid between said first position and said second position whereby to provide for the selective reflection of light from each of the reflecting surfaces presented by the reflecting liquid in each of said capillaries.

19. The optical device according to claim 18 where said electrolyte is disposed in said first gap.

20. The optical device according to claim 19 wherein said reflecting liquid is mercury.

21. The device according to claim 20 wherein the diameters of said reflecting surface measured from the centers of said capillaries is switched between a larger diameter when the reflecting fluid is in said second position and a smaller diameter is in said reflecting fluid is in said first position.

22. The device according to claim 21 further comprising bodies of absorbing material of said smaller diameter disposed on said second plate concentrically with said capillaries for preventing reflection from said reflecting liquid when in said first position.

23. The device according to claim 19 wherein said interfacial pressure changing means comprises electrodes extending into at least the one of said gaps providing said chambers for changing the potential across the interfaces between said reflecting liquid and said electrolyte in said chambers.

24. The optical device according to claim 18 wherein said gaps are symmetrically disposed about said member and are of the same width.

25. The optical device according to claim 18 further comprising annular ridges extending from the side of said member facing said transparent plate, said capillaries being in the center of said ridges.

* * * * *